United States Patent
Chakra et al.

(10) Patent No.: US 9,244,748 B2
(45) Date of Patent: Jan. 26, 2016

(54) OPERATING SYSTEM USER ACTIVITY PROFILES

(71) Applicant: INTERNATIONAL BUSINESS MACHINES CORPORATION, Armonk, NY (US)

(72) Inventors: Al Chakra, Apex, NC (US); Saurabh Gupta, Morrisville, NC (US); Nancy A. Schipon, Apex, NC (US); Aaron M. Young, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 41 days.

(21) Appl. No.: 14/295,456

(22) Filed: Jun. 4, 2014

(65) Prior Publication Data

US 2015/0355955 A1  Dec. 10, 2015

(51) Int. Cl.
*G06F 13/00* (2006.01)
*G06F 9/54* (2006.01)
*G06F 9/445* (2006.01)

(52) U.S. Cl.
CPC ............ *G06F 9/542* (2013.01); *G06F 9/44505* (2013.01)

(58) Field of Classification Search
CPC ............................... G06F 9/4443; G06F 9/546
USPC .................................................. 719/313, 329
See application file for complete search history.

(56) References Cited

U.S. PATENT DOCUMENTS

| | | | |
|---|---|---|---|
| 6,530,081 B1 | 3/2003 | Hayes et al. | |
| 7,603,331 B2 | 10/2009 | Tuzhilin et al. | |
| 9,069,458 B2 * | 6/2015 | Brewer ................. | G06F 3/0488 |
| 2007/0297590 A1 | 12/2007 | MacBeth et al. | |
| 2007/0300185 A1 * | 12/2007 | Macbeth ............... | G06F 9/4443 |
| | | | 715/825 |
| 2012/0290660 A1 | 11/2012 | Rao et al. | |
| 2013/0097695 A1 | 4/2013 | Sipe et al. | |
| 2013/0132481 A1 | 5/2013 | Lee et al. | |

* cited by examiner

*Primary Examiner* — Andy Ho
(74) *Attorney, Agent, or Firm* — Russell Ng PLLC; William Stock (57) ABSTRACT

A user profile and one or more activity profiles selectively operable when the user profile is active are stored in one or more data structures accessible by an operating system of a data processing system. The one or more activity profiles each specify an application set for a respective user activity supported by the data processing system. In response to receiving a user input selecting an activity profile among the one or more activity profiles while the data processing system is executing under the user profile, the operating system automatically starts each application in the application set specified by the activity profile and customizes a user experience by applying, to one or more applications in the application set, context information recorded during previous execution under the activity profile. During execution under the activity profile, context information for the activity profile in the one or more data structures is recorded.

20 Claims, 4 Drawing Sheets

OPERATING SYSTEM USER ACTIVITY PROFILES

BACKGROUND OF THE INVENTION

The present invention relates in general to data processing systems and, in particular, to an operating system implementing user activity profiles.

Various commercially available computer operating systems support multiple user profiles on a single physical computer system. User profiles define state information for the various users of a computer, including, for example, a set of accessible applications, network connections, storage devices and/or other resources, a desktop wallpaper, desktop icons, start menu icons, browser bookmarks, font colors and sizes, etc. In many cases, at least some of the state information for each user is user-customizable, enabling individual users to control the overall look and feel of their personal accounts. Implementation of multiple user profiles in this manner allows multiple users to access the same set of hardware and software resources while preserving the contextual state of each user in the presence of other users logging on to different user profiles.

BRIEF SUMMARY

While conventional operating system support for multiple user profiles has been useful, it is appreciated that the implementation of multiple user profiles alone does not adequately support the many activities for which an individual user may desire to utilize a data processing system. For example, it is common for a given user to perform multiple distinct activities utilizing a data processing system and to function in a different role when performing each of the activities. As such, the user may utilize different applications or other resources in each role and/or desire different appearance customizations and/or resource utilizations in each role. Prior to the present invention, a user would need to manually invoke the applications required for each activity and manually apply any desired or required customizations. As the number of applications and desired customizations multiply, the number of user-initiated operations required to achieve a desired operating system environment for a user's activity can become overwhelming, particularly as the user swaps between activities.

Accordingly, in some embodiments, a user profile and one or more activity profiles selectively operable when the user profile is active are stored in one or more data structures accessible by an operating system of a data processing system. The one or more activity profiles each specify an application set for a respective user activity supported by the data processing system. In response to receiving a user input selecting an activity profile among the one or more activity profiles while the data processing system is executing under the user profile, the operating system automatically starts each application in the application set specified by the activity profile and customizes a user experience by applying, to one or more applications in the application set, context information recorded during previous execution under the activity profile. During execution under the activity profile, context information for the activity profile in the one or more data structures is recorded.

DETAILED DESCRIPTION

Figure 1:
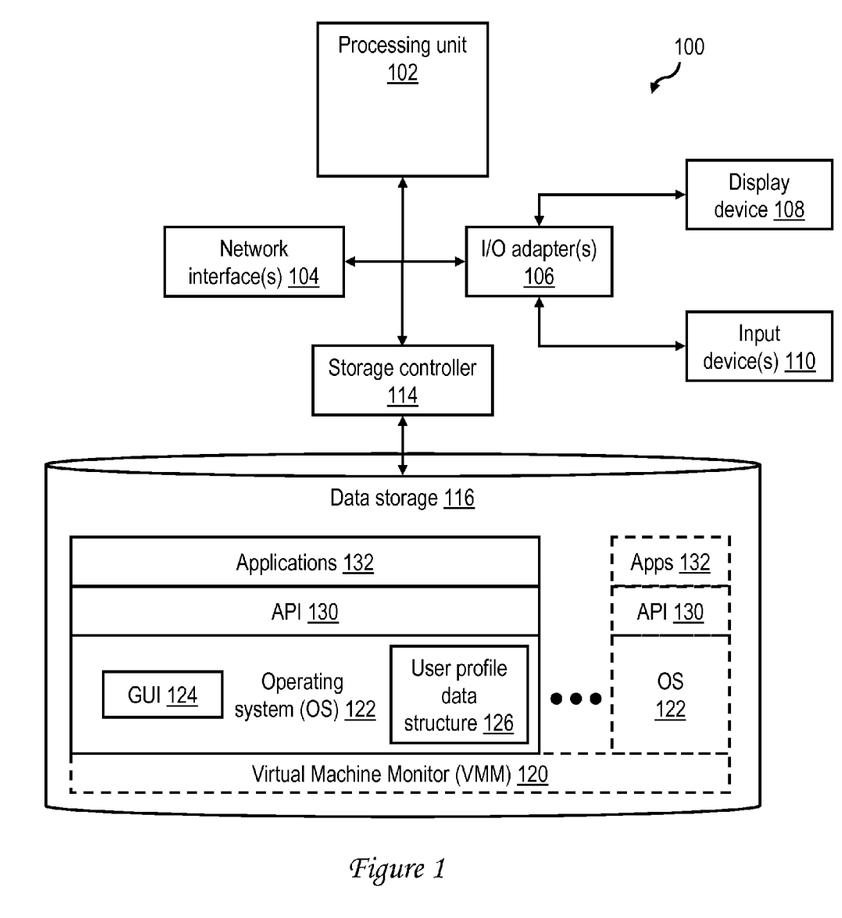
FIG. 1 is a high level block diagram of a data processing system in accordance with one embodiment.

With reference now to the figures and with particular reference to FIG. 1, there is illustrated a high level block diagram of an exemplary data processing system 100 in accordance with one embodiment. Data processing system 100, which can be, for example, a server computer system, laptop, tablet, smartphone, network switch, set top box, game console, or an embedded system, includes one or more processing units 102 (typically comprising one or more integrated circuits) that process data and program code, for example, to manage, access, communicate and manipulate data or software in data processing system 100 and/or with a remote data processing or data storage system communicatively coupled thereto.

As further illustrated in FIG. 1, data processing system 100 can also include one or more network interfaces 104 (e.g., network interface cards (NICs), converged network adapters (CNAs), wireless adapters, etc.), each of which provides an interface by which data processing system 100 can communicate data and software with remote data storage systems and/or remote data processing systems. In addition, data processing system 100 may include one or more input/output (I/O) adapters 106, which support communication with ports, a display device 108, user input device(s) 110, other attached devices, etc., which receive inputs and provide outputs of the processing performed by data processing system 100 and/or other resource(s) communicatively coupled thereto. Examples of user input device(s) 110 that may be utilized with data processing system 100 include a mouse, trackpad, touchscreen, stylus, musical or computer keyboard, microphone (for speech input), gaming controller, motion detector (e.g., for tracking eye or other bodily movements), etc.

Finally, data processing system 100 includes a storage controller 114 that controls access to data storage 116, which can include one or more volatile and/or non-volatile storage devices, such as memories (Random Access Memory (RAM), flash memory, Phase Change Memory (PCM), etc.), Solid State Drives (SSDs), optical or magnetic disk drives, tape drives, etc., for storing program code (including software, firmware or a combination thereof) and data. The program code within data storage 116 can optionally include platform virtualization program code, such as a virtual machine monitor (VMM) 120, which allocates the hardware and/or program resources of data processing system 100 among one or more virtual platforms each running its own operating system (OS) 122, such as Windows®, Linux®, UNIX®, Android, iOS, etc. Each OS 122 typically includes a kernel (not separately illustrated) and a graphical user interface (GUI) 124, which commonly provides a virtual desktop environment through which a user can graphically and intuitively interact (e.g., utilizing one or more input device(s) 110) to invoke execution of applications, access data and resources of data processing system 100 or remote data processing systems, access networks, etc. Each OS 122 additionally provides an application programming interface (API) 130 through which applications 132 executing in the operating environment provided by a OS 122 communicate with the OS 122. The applications 132 running on OSs 122 can support any of a rich variety of user activities, including various types of content creation (e.g., using office productivity software, coding software, etc.), content editing, content communication (e.g., using social media and content sharing platforms, email software, etc.) and content consumption (e.g., using document, image or video viewing software, gaming software, a web browser, etc.).

In accordance the present invention, at least one OS 122 of data processing system 100 supports the definition of one or more user profiles and maintains information defining the user profile(s) in a user profile data structure 126, which in various implementations can take the form of a database, OS registry, table, tree, list, etc. Although illustrated in FIG. 1 as forming part of an OS 122, it should be understood that user profile data structure 126 may in some embodiments be distinct from OS 122 and may, for example, simply be accessed by OS 122 or other software executing in data processing system 100 to enable user customization of the operating environment provided by OS 122. In particular, user profile data structure 126 preferably enables operating system 122 to customize the user experience based not only on which user's profile is accessed, but also on an activity of the user.

Figure 2:
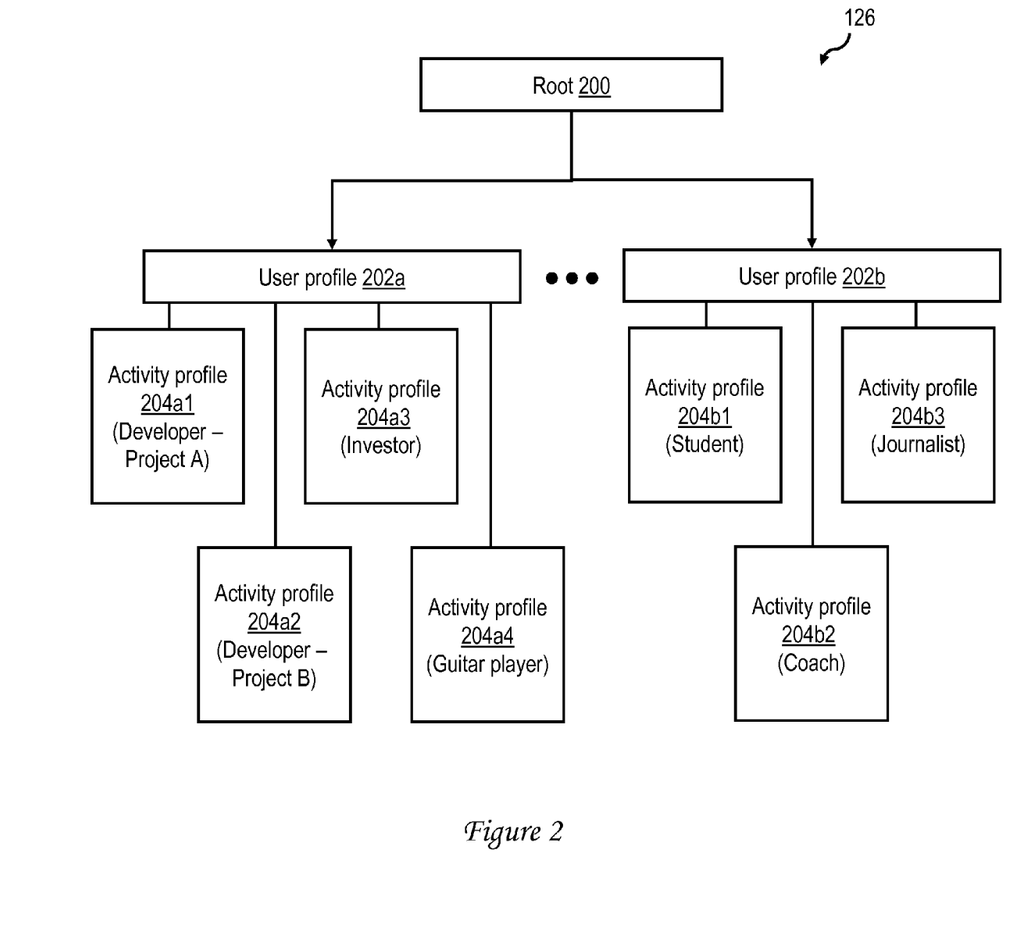
FIG. 2 is a more detailed view of an exemplary user profile data structure in accordance with one embodiment.

Referring now to FIG. 2, there is depicted a more detailed view of an exemplary user profile data structure 126 in accordance with one embodiment. In the depicted embodiment, user profile data structure 126 includes a root 200 that serves It should be understood that in some embodiments activity profiles 204 may be stored in one or more data structures separate from user profile data structure 126, and further activity profiles 204 may be stored remotely from data processing system 100 and accessed from the remote storage location by OSs 122 as needed.

Table I below provides one example of the association of applications and application state information with activity profiles. In this example, each of the four activity profiles 204a1-204a4 of user profile 202a has an associated set of applications, with each application having associated state information forming a portion of the relevant activity profile (s). For example, for activity profile 204a3, which is designed to facilitate the user's role as an investor, the associated set of applications includes a browser (e.g., FireFox, Internet Explorer, Chrome, Safari, etc.), a word processor (Microsoft Word, OpenOffice Writer, etc.), a PDF reader (e.g., Adobe Acrobat), and a media player (Windows Media Player, Adobe Flashplayer, Quicktime, etc.). A user can preferably specify which, if any, of the set of applications is/are started automatically upon loading of the activity profile, and further, which resources and application tools are automatically loaded or accessed by the application. For example, activity profile 204a3 specifies that the browser will automatically load the webpages at the URLs www.money.cnn.com and www.investors.com.

TABLE I

| Application | Developer - Project A | Developer - Project B | Investor | Guitar player |
|---|---|---|---|---|
| Textpad | Files 1, 2, ..., 10 | Files 21, 22, ..., 39 | — | — |
| Sublime | Files 41, 42, ... 47 | — | — | — |
| SlickEdit | — | Files 51, ..., 55 | — | — |
| Browser | abc.com | codeguru.com cpp.com hashing.com | money.cnn.com investors.com | guitartabs.com onlinechords.com |
| Presentation | Files 60, ..., 65 | Files 66, ..., 70 | — | — |
| Word processor | File 71 | — | File 72 | — |
| PDF reader | — | File 75 | File 76 | File 77 |
| Media player | — | — | Files 78-79 | Files 80, ..., 85 |
| ... | ... | ... | ... | ... | as an entry point into user profile data structure 126. Linked to root 200 are multiple user profiles, including user profiles 202a-202b. As noted above, user profiles 202a-202b define state information for the various users of data processing system 100, including, for example, a set of accessible applications, network connections, storage devices and/or other resources, a desktop wallpaper, desktop icons, start menu icons, browser bookmarks, font colors and sizes, etc.

One or more of user profiles 202a-202b may optionally additionally have one or more activity profiles defined for that user profile 202. For example, FIG. 2 depicts an embodiment in which user profile data structure 126 defines four activity profiles 204a1-204a4 for user profile 202a and defines three activity profiles 204b1-204b3 for user profile 202b. Each activity profile preferably includes an activity profile name identifying a user activity or user role supported by application(s) in data processing system 100, a set of applications supporting an associated user activity, and a set of state information for the activity. Thus, as indicated parenthetically in FIG. 2, activity profile 204a1, which is assigned the activity profile name "Developer—Project A", defines a set of application supporting code development of Project A and state information for each of the applications defined as a member of the set of applications identified by activity profile 204a1.

It should be noted that a given application can belong to the application of more than one activity profile, and may further have different associated state information for each of the activity profiles with which it is associated. Further user experience customizations that may be implemented by activity profiles 204 are described below with reference to FIG. 3.

Figure 3:
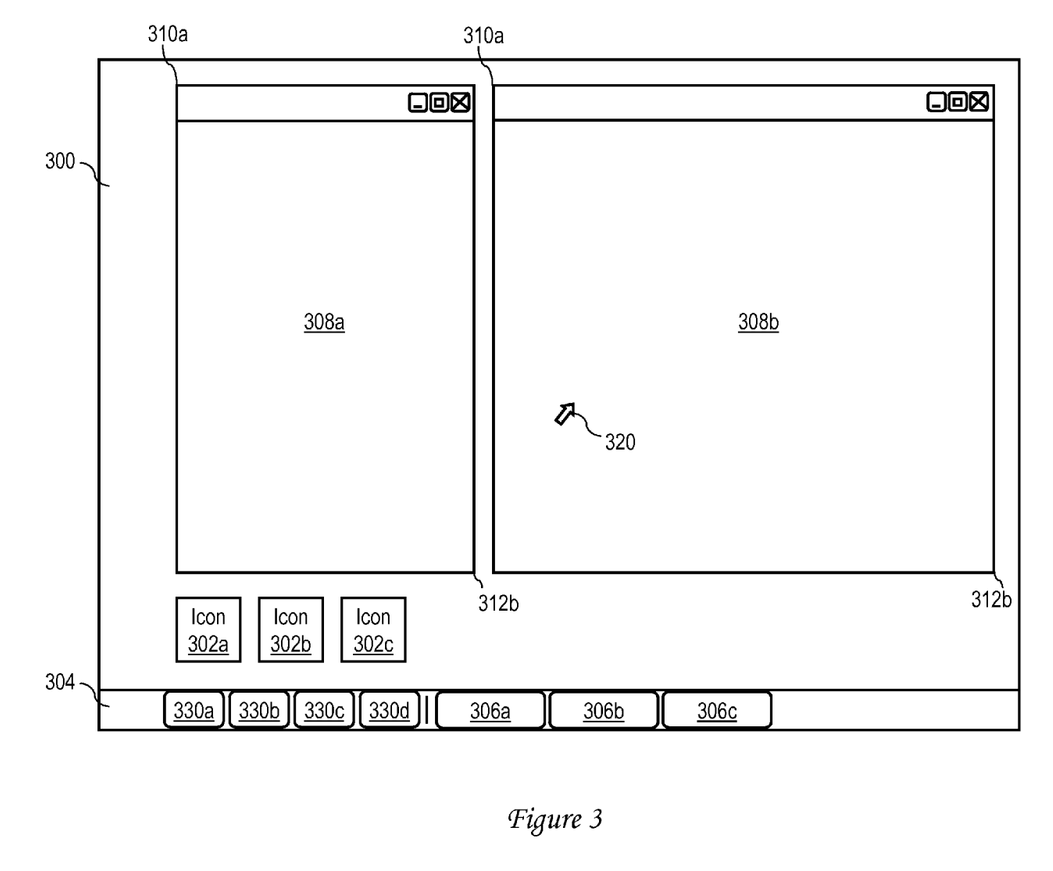
FIG. 3 is a view of an exemplary presentation of an operating system of a data processing system that presents a virtual desktop customized for a particular user activity.

With reference now to FIG. 3, there is illustrated an exemplary presentation that may be presented within a display device 108 by a graphical user interface 124 of an OS 122. The presentation includes a virtual desktop 300 upon which one or more icons 302a-302c are displayed. As is known in the art, icons 302a-302c can be selected by user to invoke execution of an associated application or to initiate access to a corresponding resource (e.g., a disk, folder, file or network location). The presentation may optionally further include a taskbar 304 or similar graphical object (e.g., Apple Launchpad) in association with which one or more taskbar buttons 306a-306c or similar user-selectable graphical elements can be displayed. As is known in the art, each of taskbar buttons 306a-306c corresponds to an accessed resource or active application 132 executing in the context of the OS 122. In the present example, the application 132 or resource corresponding to taskbar buttons 306a and 306b each have a corresponding window 308a and 308b open on virtual desktop 306. The application 132 or resource corresponding to taskbar button 306c is "minimized" and therefore does have a corresponding window open on virtual desktop 306. The respective positions and sizes of application windows 308a and 308b can be specified, for example, by the Cartesian coordinates of the upper left corner 310a and lower right corner 312b of each application window 308. In some embodiments in which users interact with the presentation provided by graphical user interface 124 utilizing a mouse, keyboard, trackpad or stylus, the presentation provided by graphical user interface 124 may additionally include a graphical cursor 320.

In the exemplary environment shown in FIG. 3, the context information maintained by an OS 122 in an activity profile 204 may additionally specify the appearance and dimensions of virtual desktop 300 (which can exceed one or more of the dimensions of display device 108). In addition, an activity profile 204 may further specify which of the automatically loaded applications 132 or automatically opened resources are initially minimized when the activity profile 204 is loaded, the sizes and positions of the windows 308 of open resources or automatically loaded applications 132, and the size and appearance of cursor 320. It should be noted that in some cases, the context information specified by a particular activity profile 204 may override the "default" state information specified by the associated user profile 202.

OS 122 preferably supports one or more controls that may be employed by a user to switch between activity profiles 204, that is, to change which activity profile is active and which activity profile(s) is/are inactive. These controls may include, for example, icons, buttons, and/or menus displayed in the presentation presented by graphical user interface 124 within a display device 108, where such controls can be selected by the user using, for example, cursor 320 or a touch input. For example, in the exemplary embodiment of FIG. 3, graphical user interface 124 presents on taskbar 304 a number of icons 330a-330d each corresponding to a respective one of activity profiles 204a1-204a4. In this example, user selection of one of icons 330a-330d causes the corresponding one of activity profiles 204a1-204a4 to be activated and others of activity profiles 204a1-204a4 to be closed. In other embodiments, the controls supported by OS 122 for activating and closing activity profiles may alternatively or additionally include gestures, speech inputs, and the like.

Figure 4:
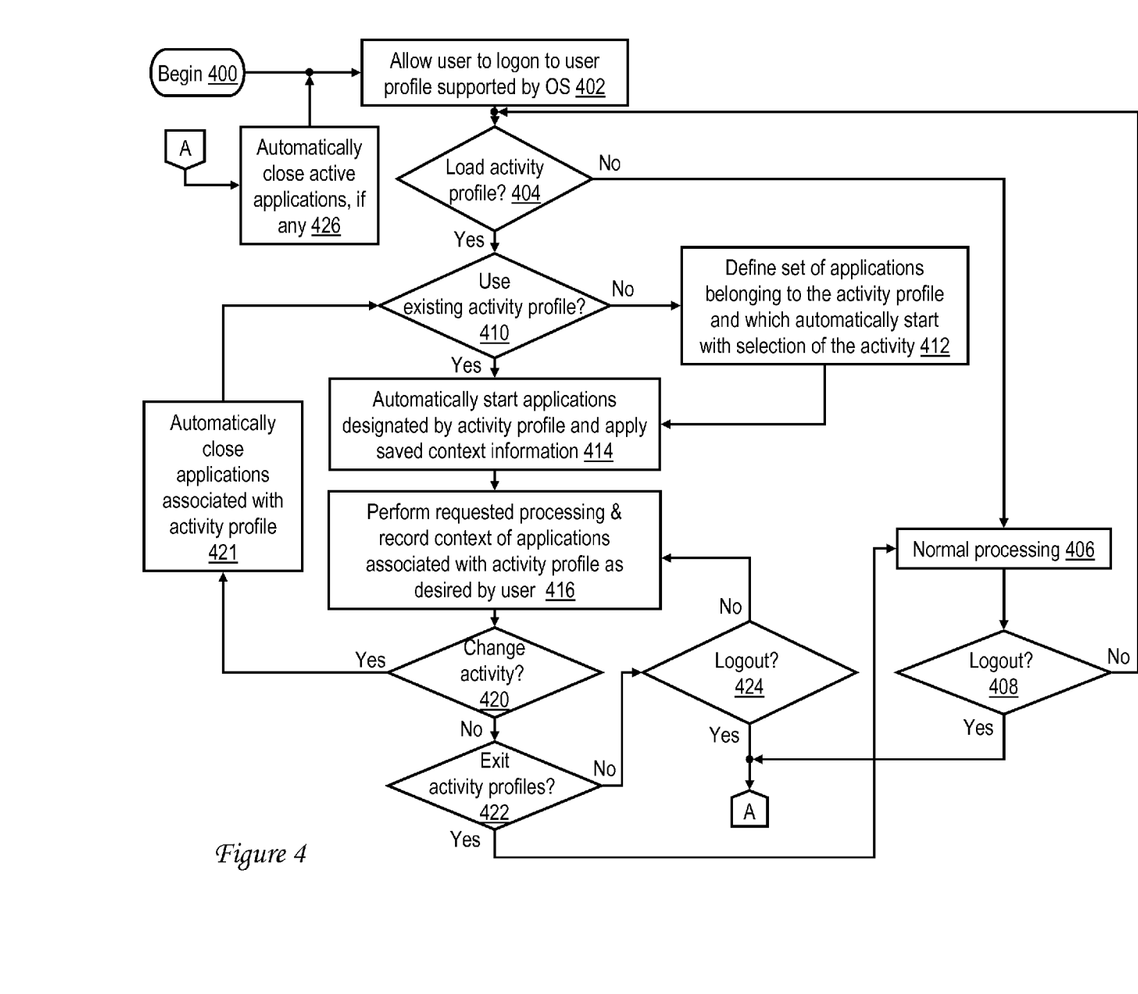
FIG. 4 is a high level logical flowchart of an exemplary process for data processing under a user activity profile in accordance with one embodiment.

Referring now to FIG. 4, there is depicted a high level logical flowchart of an exemplary process for processing a user activity profile in accordance with one embodiment. As a logical flowchart, steps are presented in logical rather than strictly chronological order, and one or more of the illustrated steps can be performed in a different order than depicted and/or concurrently.

The process of FIG. 4 begins at block 400, for example, at some time following the boot of an OS 122 on data processing system 100. The graphical user interface 124 of the OS 122 preferably presents within display device 108 a presentation such as that shown in FIG. 3 that the user can customize utilizing one or more activity profiles 204. The process then proceeds from block 400 to block 402, which depicts OS 122 allowing a user to logon to one of possibly multiple user profiles 202 supported by the OS 122, for example, through entry of a password or passcode. At block 404, OS 122 monitors to detect user entry of an input requesting that OS 122 load an activity profile 204 supported by the active user profile 202. If not, the process passes from block 404 to block 406, which illustrates OS 122 supporting normal processing of applications and data by data processing system 100, which processing can be entirely conventional. The normal processing performed at block 406 can include the OS 122 providing any user experience customizations defined by the current user profile 202. At block 408 OS 122 monitors to detect whether the user has logged out of the current user profile 202. If not, the process returns to block 404, which has been described. If, however, OS 122 determines at block 408 that the user has logged out of the current user profile 202, the process of FIG. 4 passes through page connector A to block 426, which illustrates OS 122 closing any active application(s) running under the current user profile 202. The process thereafter returns to block 402, which has been described.

Returning to block 404, in response to OS 122 detecting that the user has entered an input requesting OS 122 to load an activity profile 204 supported by the current user profile 202, the process proceeds to block 410, which illustrates OS 122 determining whether or not the user input(s) request OS 122 to use an existing activity profile 204 or to establish a new activity profile 204. In response to a determination at block 410 that the user input(s) request use of an existing activity profile 204, the process proceeds to block 414, which is described below. If, however, OS 122 determines at block 410 that the user input(s) request establishment of a new activity profile 204, the process proceeds to block 412. At block 412, OS 122 defines a set of applications belonging to the new activity profile 204, for example, based on one or more inputs received from a user via graphical user interface 124. In at least some embodiments, OS 122 may further define one or more user-customizable default activity profiles 204 established without user input. These default activity profiles 204 can correspond, for example, to common user activities such as online shopping, communicating (e.g., via email, social media, blogging, etc.) and viewing (e.g., streaming video content, news websites, online magazines, etc.). Block 412 further illustrates that OS 122 may optionally configure the new activity profile 204 so that one or more of the applications in the set of applications defined for the activity profile 204 start automatically in response to loading of the activity profile 204. As noted above with reference to FIG. 3, OS 122 may further configure one or more of the automatically started applications to execute in a minimized state.

Following block 410 or block 412, the process of FIG. 4 proceeds to block 414, which depicts OS 122 automatically starting each application 132 in the set of applications 132 belonging to the activity profile 204 selected by the user. OS 122 applies to the applications 132 and generally to the presentation of graphical user interface 124 any context information recorded during previous execution under the activity profile 204. Next, at block 416, during operation of data processing system 100 under the selected user profile 204, OS 122 performs any requested processing and records the context of each active application 132 belonging to the activity profile 204 and other activity profile context information, as desired by the user. The scope of the context information, which can be determined by user selection or by default, can include, for example, the sizes and locations of windows 308 with reference to virtual desktop 300, which files or other resources are opened by OS 122 and/or applications 132, toolbars open in applications 132, the size and appearance of cursor 320, a wallpaper applied to virtual desktop 300, etc. The timing of recording and/or updating the context information for the activity profile 204 can also be determined by user input or by default and can occur, for example, at periodic intervals, in response to a user input requesting a "snapshot" be taken of a current context, and/or when the user switches between activity profiles 204 or logs out of the current user profile 202.

At block 420, OS 122 monitors to detect whether an input has been received indicating that the user desires to switch from a current activity profile to a different activity profile 204. If so, OS 122 automatically closes the applications 132 associated with the current activity profile 204 (e.g., if those applications 132 are not associated with the different activity profile selected by the user), as shown at block 421. The process the returns from block 421 to block 410, which has been described. If, however, OS 122 has not received an input indicating that the user desires to switch activity profiles, the process proceeds block 420 to block 422, which illustrates OS 122 monitoring to detect whether an input has been received indicating that the user desires to exit processing using activity profiles 204. If so, the process passes from block 422 to block 406, which has been described. If, however, OS 122 has not received an input indicating the user desires to exit processing using activity profiles 204, the process proceeds from block 422 to block 424. At block 424, OS 122 monitors to detect whether an input has been received indicating that the user desires to logout of the current user profile 202. If so, the process of FIG. 4 returns from block 424 through page connector A to block 426, which has been described. If, however, OS 122 has not received an input indicating that the user desires to logout of the current user profile 202, the process returns from block 424 to block 416, which has been described.

As has been described, in some embodiments, a user profile and one or more activity profiles selectively operable when the user profile is active are stored in one or more data structures accessible by an operating system of a data processing system. The one or more activity profiles each specify an application set for a respective user activity supported by the data processing system. In response to receiving a user input selecting an activity profile among the one or more activity profiles while the data processing system is executing under the user profile, the operating system automatically starts each application in the application set specified by the activity profile and customizes a user experience by applying, to one or more applications in the application set, context information recorded during previous execution under the activity profile. During execution under the activity profile, context information for the activity profile in the one or more data structures is recorded.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been particularly shown as described with reference to one or more preferred embodiments, it will be understood by those skilled in the art that various changes in form and detail may be made therein without departing from the spirit and scope of the invention.

What is claimed is:

1. A method of data processing in a data processing system including a processing unit and data storage that stores program code including an operating system and one or more applications, the method comprising:
   storing in one or more data structures accessible by the operating system, a user profile and one or more activity profiles selectively operable when the user profile is active, wherein the one or more activity profiles each specify an application set for a respective user activity supported by the data processing system;
   in response to receiving a user input selecting an activity profile among the one or more activity profiles while the data processing system is executing under the user profile, the operating system automatically starting each application in the application set specified by the activity profile and customizing a user experience by applying, to one or more applications in the application set, context information recorded during previous execution under the activity profile; and
   during execution under the activity profile, recording context information for the activity profile in the one or more data structures.

2. The method of claim 1, wherein:
   the activity profile is a first activity profile;
   the one or more activity profiles include at least the first activity profile and a second activity profile; and
   in response to a user input indicating a desire to switch from the first activity profile to the second activity profile, automatically closing at least one application in the application set of the first activity profile and automatically starting one or more applications in an application set of the second activity profile.

3. The method of claim 1, wherein applying the context information includes the operating system applying, to at least one window presented on a virtual desktop in a display device, a size and position specified by the context information recorded during previous execution under the activity profile.

4. The method of claim 1, wherein applying the context information includes opening a resource accessed by an application in the application set.

5. The method of claim 1, wherein customizing the user experience includes:
   the operating system overriding state information specified by the user profile with context information of the activity profile.

6. The method of claim 1, and further comprising:
   in response to a user input, exiting execution under the activity profile and continuing execution under the user profile, such that the operating system does not record further context information for the activity profile until a user input that requests execution under the activity profile is received.

7. The method of claim 1, wherein the storing includes storing the activity profile in the one or more data structures accessible by the operating system in response to one or more user inputs defining the application set.

8. A data processing system, comprising:
   a processing unit; and
   data storage coupled to the processing unit, wherein the data storage stores program code including an operating system and one or more applications, and wherein the operating system, when executed by the processing unit, causes the data processing system to perform:
      storing in one or more data structures accessible by the operating system, a user profile and one or more activity profiles selectively operable when the user profile is active, wherein the one or more activity profiles each specify an application set for a respective user activity supported by the data processing system;
      in response to receiving a user input selecting an activity profile among the one or more activity profiles while the data processing system is executing under the user profile, automatically starting each application in the application set specified by the activity profile and customizing a user experience by applying, to one or more applications in the application set, context information recorded during previous execution under the activity profile; and
      during execution under the activity profile, recording context information for the activity profile in the one or more data structures.

9. The data processing system of claim 8, wherein:
   the activity profile is a first activity profile;
   the one or more activity profiles include at least the first activity profile and a second activity profile; and
   the operating system, when executed by the processing unit, causes the data processing system to perform:
      in response to a user input indicating a desire to switch from the first activity profile to the second activity profile, automatically closing at least one application in the application set of the first activity profile and automatically starting one or more applications in an application set of the second activity profile.

10. The data processing system of claim 8, wherein the context information applied by the operating system includes a size and position of at least one window presented on a virtual desktop in a display device.

11. The data processing system of claim 8, wherein application of the context information by the operating system includes the operating system opening a resource accessed by an application in the application set.

12. The data processing system of claim 8, wherein customization of the user experience includes the operating system overriding state information specified by the user profile with context information of the activity profile.

13. The data processing system of claim 8, wherein the operating system, when executed by the processing unit, further causes the data processing system to perform:
in response to a user input, exiting execution under the activity profile and continuing execution under the user profile, such that the operating system does not record further context information for the activity profile until a user input that requests execution under the activity profile is received.

14. The data processing system of claim 8, wherein the operating system stores the activity profile in the one or more data structures accessible by the operating system in response to one or more user inputs defining the application set.

15. A program product, comprising:
a data storage device; and
program code stored within the data storage device, wherein the program device includes an operating system that, when executed by a processing unit of a data processing system, causes the data processing system to perform:
storing in one or more data structures accessible by the operating system, a user profile and one or more activity profiles selectively operable when the user profile is active, wherein the one or more activity profiles each specify an application set for a respective user activity supported by the data processing system;
in response to receiving a user input selecting an activity profile among the one or more activity profiles while the data processing system is executing under the user profile, automatically starting each application in the application set specified by the activity profile and customizing a user experience by applying, to one or more applications in the application set, context information recorded during previous execution under the activity profile; and
during execution under the activity profile, recording context information for the activity profile in the one or more data structures.

16. The program product of claim 15, wherein:
the activity profile is a first activity profile;
the one or more activity profiles include at least the first activity profile and a second activity profile; and
the operating system, when executed by the processing unit, causes the data processing system to perform:
in response to a user input indicating a desire to switch from the first activity profile to the second activity profile, automatically closing at least one application in the application set of the first activity profile and automatically starting one or more applications in an application set of the second activity profile.

17. The program product of claim 15, wherein applying the context information includes the operating system applying, to at least one window presented on a virtual desktop in a display device, a size and position specified by the context information recorded during previous execution under the activity profile.

18. The program product of claim 15, wherein applying the context information includes opening a resource accessed by an application in the application set.

19. The program product of claim 15, wherein customizing the user experience includes:
the operating system overriding state information specified by the user profile with context information of the activity profile.

20. The program product of claim 15, wherein the operating system, when executed by the processing unit, causes the data processing system to perform:
in response to a user input, exiting execution under the activity profile and continuing execution under the user profile, such that the operating system does not record further context information for the activity profile until a user input that requests execution under the activity profile is received.

* * * * *